United States Patent
Li et al.

(10) Patent No.: US 12,207,309 B2
(45) Date of Patent: Jan. 21, 2025

(54) DATA MERGING METHOD AND APPARATUS OF PHYSICAL RANDOM ACCESS CHANNEL, AND STORAGE MEDIUM

(71) Applicant: SANECHIPS TECHNOLOGY CO., LTD., Shenzhen (CN)

(72) Inventors: Dong Li, Shenzhen (CN); Wenyue Liu, Shenzhen (CN)

(73) Assignee: SANECHIPS TECHNOLOGY CO., LTD., Shenzhen (CN)

(*) Notice: Subject to any disclaimer, the term of this patent is extended or adjusted under 35 U.S.C. 154(b) by 395 days.

(21) Appl. No.: 17/770,008

(22) PCT Filed: Oct. 19, 2020

(86) PCT No.: PCT/CN2020/121775
§ 371 (c)(1),
(2) Date: Apr. 18, 2022

(87) PCT Pub. No.: WO2021/073632
PCT Pub. Date: Apr. 22, 2021

(65) Prior Publication Data
US 2022/0394774 A1 Dec. 8, 2022

(30) Foreign Application Priority Data
Oct. 18, 2019 (CN) .......................... 201910996258.4

(51) Int. Cl.
*H04W 74/0833* (2024.01)
*G06F 7/14* (2006.01)
*H04B 7/02* (2018.01)

(52) U.S. Cl.
CPC .......... *H04W 74/0833* (2013.01); *G06F 7/14* (2013.01); *H04B 7/02* (2013.01)

(58) Field of Classification Search
CPC ......... H04W 74/0833; H04B 7/02; G06F 7/14
See application file for complete search history.

(56) References Cited

U.S. PATENT DOCUMENTS

| 8,370,585 B2 * | 2/2013 | Ukai ...................... G06F 12/084 |
| | | 711/129 |
| 2022/0104279 A1 * | 3/2022 | Yamamoto ........ H04W 74/0833 |
| 2022/0217654 A1 * | 7/2022 | Kang ..................... H04W 52/14 |

FOREIGN PATENT DOCUMENTS

| CN | 102612051 A | 7/2012 |
| CN | 102869027 A | 1/2013 |

(Continued)

OTHER PUBLICATIONS

International Search Report for Application No. PCT/CN2020/121775, dated Jan. 11, 2021, 4 pages including English translation.

(Continued)

*Primary Examiner* — Won Tae C Kim
(74) *Attorney, Agent, or Firm* — Morgan, Lewis & Bockius LLP (57) ABSTRACT

Provided are a data merging method and apparatus for physical random access channel (PRACH) data merging, and a storage medium. The method includes the following. A task parameter of Current PRACH data merging is parsed. PRACH data of a to-be-merged antenna is read from a PRACH data cache. PRACH data merging between multiple antennas and/or RACH data merging within a PRACH of a present antenna are performed according to the task parameter. Merged data is output to a shared cache.

11 Claims, 5 Drawing Sheets

(56) References Cited

FOREIGN PATENT DOCUMENTS

| CN | 103796330 A | 5/2014 |
|---|---|---|
| EP | 3148281 A1 | 3/2017 |
| GB | 2538316 A | 11/2016 |
| JP | H11252045 A | 9/1999 |
| JP | 2017522744 A | 8/2017 |
| JP | 2020532239 A | 11/2020 |
| WO | WO2018/130017 A1 | 7/2018 |
| WO | WO-2019161806 A1 | 8/2019 |

OTHER PUBLICATIONS

ZTE Corporation, et al., "Random access in NR", 3GPP TSG RAN WG2 Meeting #96 R2-167831, Nov. 5, 2016 (Nov. 5, 2016), Reno, USA, Nov. 14-18, 2016.
Japanese Office Action for Application No. 2022-523156, dated May 17, 2023, 20 pages including English translation.
Qualcom Incorporated, "PRACH design consideration," 3GPP TSG-RAN WG1 #88bis, R1-1705571, Apr. 3-7, 2017, 22 pages.
Chinese Office Action for Application No. 201910996258.4, dated Feb. 9, 2024, 8 pages including English translation.
Chinese Search Report for Application No. 201910996258.4, dated Feb. 8, 2024, 4 pages including English translation.

* cited by examiner

DATA MERGING METHOD AND APPARATUS OF PHYSICAL RANDOM ACCESS CHANNEL, AND STORAGE MEDIUM

CROSS-REFERENCES TO RELATED APPLICATIONS

This is a National Stage Application, filed under 35 U.S.C. 371 of International Patent Application No. PCT/CN2020/121775, filed on Oct. 19, 2020, which is based on and claims priority to Chinese Patent Application No. 201910996258.4 filed with the China National Intellectual Property Administration (CNIPA) on Oct. 18, 2019, the disclosure of which is incorporated herein by reference in its entirety.

This application claims priority to Chinese Patent Application No. 201910996258.4 filed with the China National Intellectual Property Administration (CNIPA) on Oct. 18, 2019, the disclosure of which is incorporated herein by reference in its entirety.

TECHNICAL FIELD

The present disclosure relates to the communication field, for example, a method and apparatus for physical random access channel (PRACH) data merging and a storage medium.

BACKGROUND

In the New Radio (NR) protocol of the 5th Generation (5G) mobile communication technology, the physical random access channel has multiple access formats, such as a long format and a short format and a variety of corresponding combinations.

For physical random access channel (PRACH) processing in the 5G NR protocol, multiple pieces of random access channel (RACH) data in the same PRACH need to be merged, and PRACH data of different antennas needs to be merged.

Figure 1:
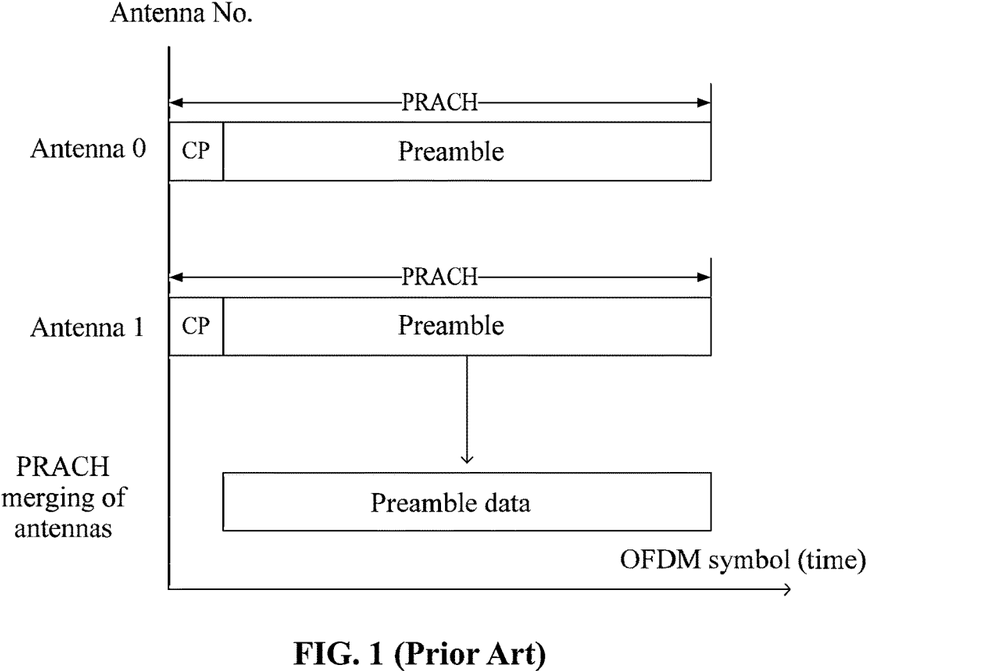
FIG. 1 is a diagram showing PRACH data merging between antennas according to the related art.
Figure 2:
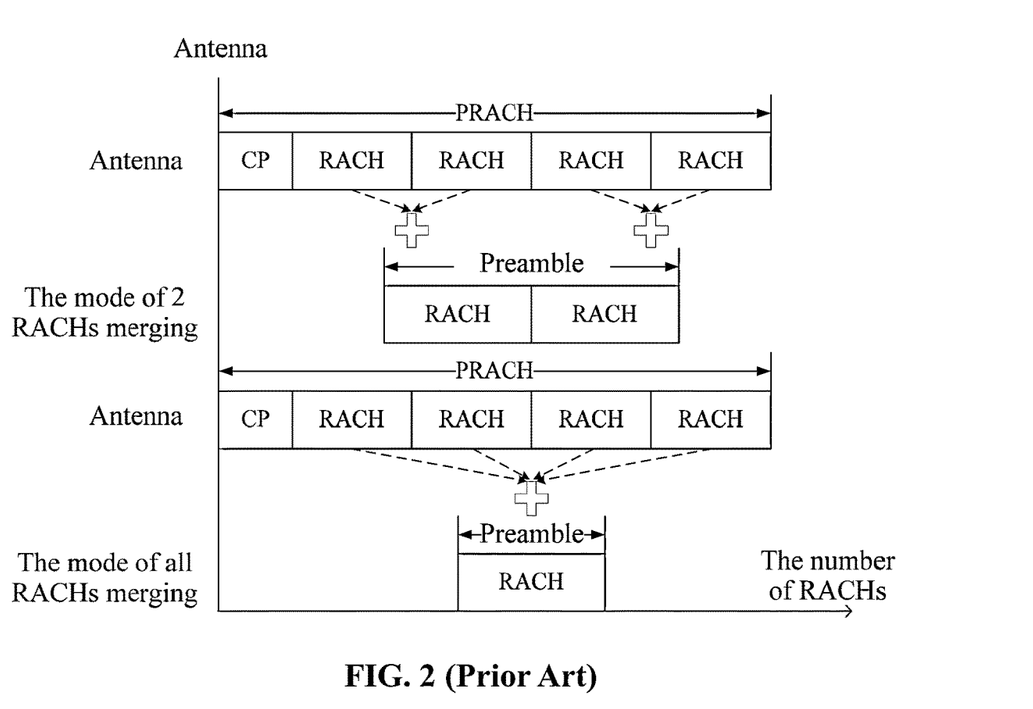
FIG. 2 is a diagram showing RACH data merging within PRACHs according to the related art.

The data merging of the PRACH after down conversion includes different modes according to different PRACH formats. The merging of long formats refers to that PRACH data of multiple antennas is added and merged, as show in FIG. 1. The merging of short formats has two manners. In one mode, PRACH data of multiple antennas is added and merged, and two adjacent RACHs in the merged PRACH data are further added and merged, or all RACHs in the merged PRACH data are added and merged. In the other manner, PRACH data of the multiple antennas is not merged, while two adjacent RACHs in PRACH data of each antenna are directly added, or all RACHs in PRACH data of each antenna are added, as shown in FIG. 2.

In the related art, single frequency random access data merging is mostly achieved by using software, that is, the software processes random access data merging of one frequency of one antenna at a time, which has problems described below.

First, for the frequency division duplex (FDD) mode, only one access frequency exists, so that only one single frequency apparatus is required. However, for the time division duplex (TDD) mode, when multiple frequencies exist, either multiple sets of single frequency apparatuses are used for simultaneously processing multiple frequencies in parallel, that is, multiple apparatuses are added, which leads to the waste of resources, or a single frequency apparatus is used in time division multiplexing, which leads to the large processing latency and the large processing calculation cost.

Second, the volume of PRACH data of each antenna is very large, caching PRACH data of all antennas for data merging will result in the large storage space to be occupied and the large processing latency of a central processing unit (CPU).

SUMMARY

The present disclosure provides a method and apparatus for physical random access channel (PRACH) data merging and a storage medium to solve the problem in the related art of low processing efficiency of using software to achieve single frequency random access data merging.

A method for physical random access channel (PRACH) data merging is provided. The method includes the following. A task parameter of current PRACH data merging is parsed. PRACH data of a to-be-merged antenna is read from a PRACH data cache. PRACH data merging between multiple antennas and/or RACH data merging within a PRACH of a present antenna are performed according to the task parameter. Merged data is output to a shared cache.

An apparatus for physical random access channel (PRACH) data merging is further provided. The apparatus includes a parsing module, a reading module, a merging module and an output module. The parsing module is configured to parse a task parameter of current PRACH data merging. The reading module is configured to read PRACH data of a to-be-merged antenna from a PRACH data cache. The merging module is configured to perform PRACH data merging between multiple antennas and/or RACH data merging within a PRACH of a present antenna according to the task parameter. The output module is configured to output merged PRACH data to a shared cache.

Optionally, the task parameter includes at least one of: a PRACH format, a data merging mode, a data storage address or data volume of PRACH data in a current orthogonal frequency-division multiplexing (OFDM) symbol.

Optionally, the reading module is configured to read to-be-merged PRACH data from the PRACH data cache successively in units of an OFDM symbol, and start data merging every time a piece of OFDM symbol data is received.

Optionally, the merging module further includes a determination module, a first merging unit and a second merging unit. The determination module is configured to determine whether to-be-merged PRACH data of the multiple antennas needs to be merged and determine whether RACH data needs to be merged. The first merging unit is configured to: in a case where the PRACH data of the multiple antennas needs to be merged, merge the to-be-merged PRACH data of the multiple antennas according to an OFDM symbol time in time division. The second merging unit is configured to merge RACH data within the PRACH data merged by the first merging unit.

Optionally, the merging module further includes a caching and restoring unit. The caching and restoring unit is configured to for PRACH data merging between antennas or RACH data merging within a PRACH of a present PRACH, after PRACH data processing during a current OFDM symbol time, cache field data, and restore field data of a corresponding antenna for continuing processing after PRACH data of a next OFDM symbol.

Optionally, the apparatus further includes a configuration module. The configuration module is configured to configure the task parameter of the Current PRACH data merging.

Optionally, the apparatus further includes a software processing module. The software processing module is configured to perform processing of a fast Fourier transform (FFT), a frequency domain mother code relation, an inverse fast Fourier transform (IFFT) and data merging peak detection on a merged preamble sequence.

A storage medium is further provided. The storage medium stores a computer program which is configured to, when executed, implement the method of the present disclosure.

An electronic apparatus is further provided. The apparatus includes a memory and a processor. The memory stores a computer program, and the processor is configured to execute the computer program to implement the method of the present disclosure.

BRIEF DESCRIPTION OF DRAWINGS

The drawings described herein are used for providing an understanding of the present disclosure and forming a part of the present disclosure. Exemplary embodiments and descriptions thereof in the present disclosure are used for explaining the present disclosure and do not limit the present disclosure in any improper way.

DETAILED DESCRIPTION

The present disclosure will be described hereinafter with reference to drawings and embodiments. It is to be noted that if not in collision, the embodiments and features therein in the present disclosure may be combined with each other.

It is to be noted that the terms "first", "second" and the like in the description, claims and the preceding drawings of the present disclosure are used for distinguishing between similar objects and are not necessarily used for describing a particular order or sequence.

Figure 3:
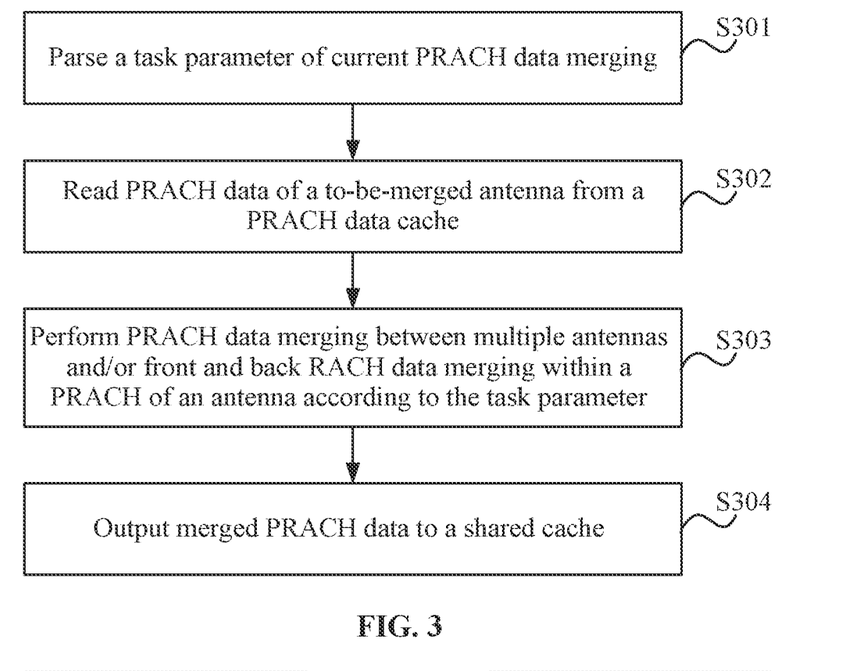
FIG. 3 is a flowchart of a method for PRACH data merging according to an embodiment of the present disclosure.

The embodiment provides a method for physical random access channel (PRACH) data merging. FIG. 3 is the flowchart of the method according to the embodiment of the present disclosure. As shown in FIG. 3, the flow includes the following.

In S301, a task parameter of current PRACH data merging is parsed.

In S302, PRACH data of a to-be-merged antenna is read from a PRACH data cache.

In S303, PRACH data merging between multiple antennas and/or front and back RACH data merging within a PRACH of an antenna are performed according to the task parameter.

In S304, merged PRACH data is output to a shared cache.

In S301 of the embodiment, the task parameter includes at least one of: a PRACH format, a data merging mode, a data storage address, or data volume of PRACH data in a current orthogonal frequency-division multiplexing (OFDM) symbol.

In S302 of the embodiment, to-be-merged PRACH data is read from the PRACH data cache successively in units of an OFDM symbol, and the PRACH data merging is started every time a piece of OFDM symbol data is received.

In S303 of the embodiment, whether the PRACH data merging between the multiple antennas needs to be performed may be determined first. If it is required to perform the PRACH data merging between the multiple antennas, PRACH data of the multiple antennas is merged according to an OFDM symbol time in time division, and then front and back RACH data within a PRACH of an antenna is merged.

In S303, for PRACH data merging between antennas or PRACH data merging within the antenna, after PRACH data processing during a current OFDM symbol time, field data is cached, and field data of a corresponding antenna is restored for continuing processing after PRACH data of a next OFDM symbol time arrives.

Before S301 of the embodiment, the following may further be included. The task parameter of the current PRACH data merging is configured.

After S304 of the embodiment, the following may further be included. Processing of a fast Fourier transform (FFT), a frequency domain mother code relation, an inverse fast Fourier transform (IFFT) and data merging peak detection are performed on a merged preamble sequence.

In the preceding embodiment of the present disclosure, multiple frequencies and multiple PRACH formats can be adapted to through the task parameter, and thus data processing of multiple different PRACHs can be completed, thereby improving the processing efficiency.

To facilitate the understanding of the embodiments of the present disclosure, description will be made through embodiments in application scenes.

The embodiment provides a method for PRACH data merging in the 5G NR. In the embodiment, different configuration cases of antennas and frequencies may be selected to simultaneously complete PRACH data merging of multiple frequencies. In addition, in the embodiment, the combination configuration of different bandwidths and different PRACH formats may be supported, so that the speed is fast, the computation cost is saved, the processing resources and power consumption are saved, and the excellent flexibility and scalability are achieved.

In the embodiment, an OFDM symbol is taken as the processing unit, PRACH data of n (n may be configured according to software) OFDM symbols is processed every time, and PRACH data of multiple antennas is merged in time division. The multiple antennas multiplex a PRACH data merging module to complete respective processing in order. The configured parameter configuration is parsed before each start of PRACH data merging, and information of current data merging processing, such as the PRACH format, the merging type, the amount of merged data, the PRACH frequency point and the amount of merged data completed by the current PRACH, is obtained for merging processing.

Figure 4:
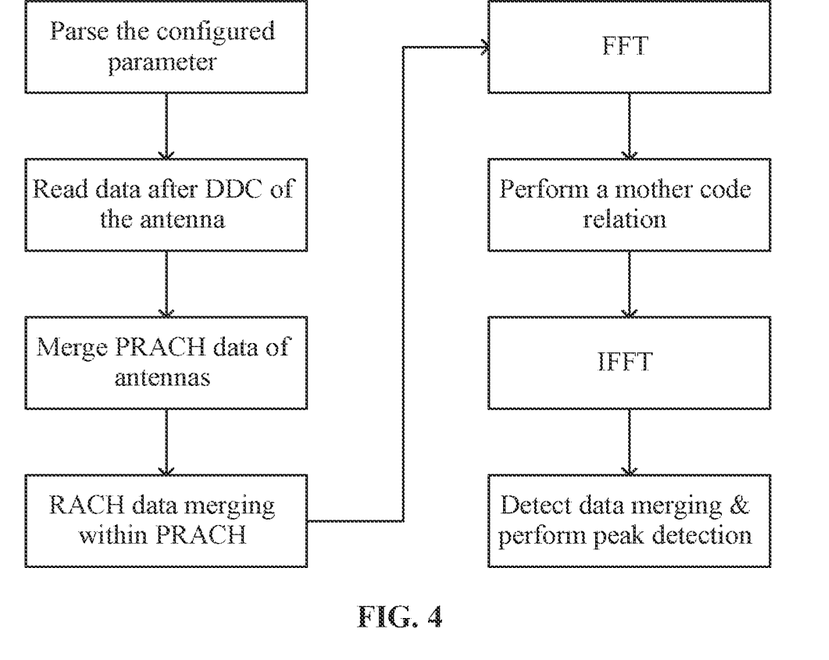
FIG. 4 is a diagram showing a PRACH data merging flow according to an optional embodiment of the present disclosure.

As shown in FIG. 4, processing steps of the embodiment are successively as follows: parsing the configured parameter, reading PRACH data, merging PRACH data of antennas, merging RACH data within the PRACH of an antenna, performing an FFT, performing a mother code relation processing, performing an IFFT and performing peak detection.

Figure 5:
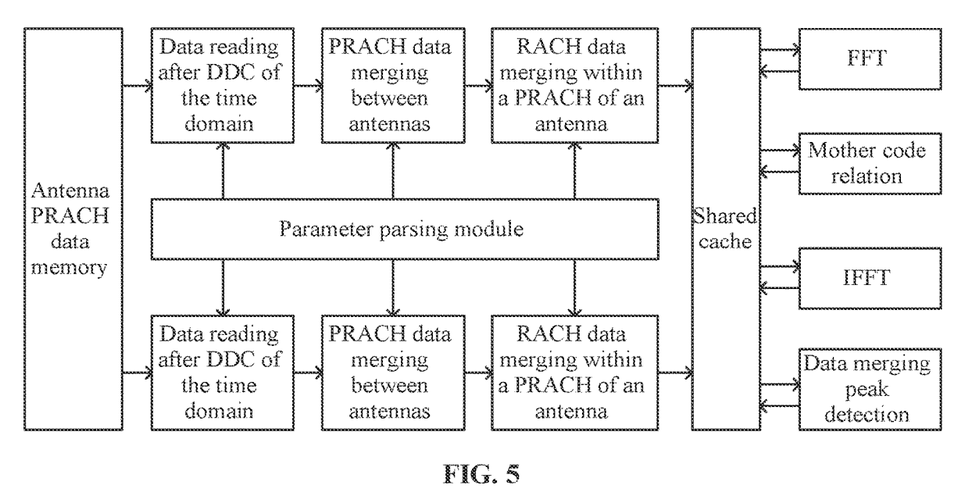
FIG. 5 is a diagram showing a processing apparatus according to an embodiment of the present disclosure.

FIG. 5 is a diagram showing a processing apparatus of the embodiment. As shown in FIG. 5, the apparatus is divided into two basic modules, that is, a hardware acceleration module and a software processing module, according to features of each step in FIG. 4.

The hardware acceleration module successively completes configured parameter parsing, PRACH data reading, PRACH data merging between antennas and RACH data merging within a PRACH of an antenna. The software processing module successively completes the processing of an FFT, a frequency domain mother code relation, an IFFT and a peak detection function. The two modules exchange data through a shared cache.

In the embodiment, the data of the PRACH is written into a data memory in order in units of an OFDM symbol. Therefore, for the merging of the data of the PRACH, the data is also processed in units of an OFDM symbol time, and redundant data is not cached, so as to respond to processing of different PRACH formats in real time. The PRACH data merging processing is started every time a piece of OFDM data is received, and data of a next OFDM symbol may be antenna data of different PRACH formats and different cells.

Figure 6:
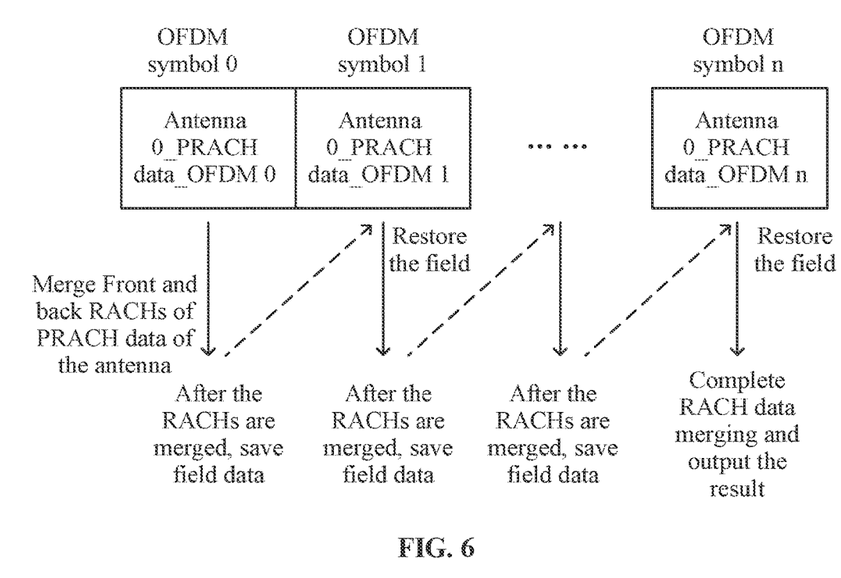
FIG. 6 is a diagram showing data processing in a case of a single antenna according to an embodiment of the present disclosure.

FIG. 6 is a diagram showing single antenna data processing. As shown in FIG. 6, a single antenna hardware acceleration module reads data received by a PRACH according to an OFDM symbol time, starts PRACH data merging processing through the software processing module, and then caches field data to wait for data of a next OFDM symbol.

Figure 7:
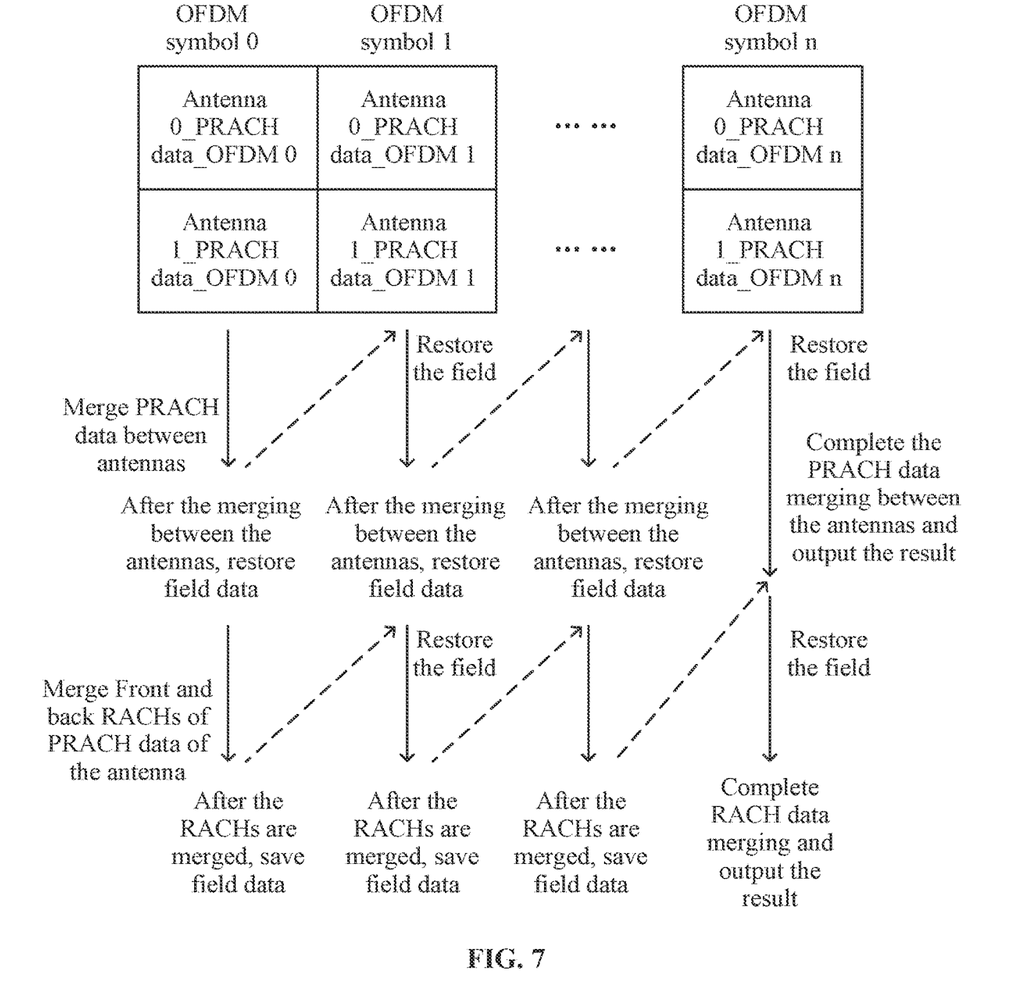
FIG. 7 is a diagram showing data processing in a case of multiple antennas according to an embodiment of the present disclosure.

FIG. 7 is a diagram showing multiple antenna data processing. As shown in FIG. 7, in a case of multiple antennas, when PRACH data merging processing of the multiple antennas is performed during an OFDM symbol, it is required to perform data merging between antennas for PRACHs of different antennas, then perform RACH data merging within a PRACH of an antenna, cache field data to wait for PRACH data of a next OFDM symbol, and restore field data of a corresponding antenna for continuing processing. Finally, an accelerator outputs the result of data merging between antennas and the result of RACH data merging to a data cache for subsequent PRACH data processing by software.

Since the software processing module needs to complete the FFT/IFFT processing, data interleaving exists, so that the data of the OFDM symbol cannot be used as the processing unit, and the subsequent processing by software can be started after the hardware acceleration module completes the complete PRACH data processing of the antennas.

In the preceding embodiments of the present disclosure, compared with the related art, the data merging processing after the PRACH subjected to down conversion is more efficient than the PRACH merging processing completely by software, and can flexibly adapt to multiple PRACH formats compared with processing completely by hardware, so that power consumption is saved, resource consumption is reduced, processing time is reduced, and user perception is improved. At the same time, the parameter selection is handled by software control, so that the evolution of the 5G NR protocol can be flexibly adapted to, and thus the investment is protected.

The apparatus in the preceding embodiments is described below according to modules.

The apparatus of the embodiment supports multiple long code formats and short code formats of the 5G NP PRACH protocol.

As shown in FIG. 5, each OFDM symbol generates a time interruption, at this time, a parameter parsing module obtains a task parameter of data processing of this time from a cache, and obtains a required PRACH format, a data merging mode, a data storage address and data volume of PRACH data in the current OFDM symbol from the task parameter.

An inter-antenna data merging module merges PRACH data of different antennas, that is, correspondingly adds respective PRACH data of multiple antennas. If only a single antenna exists or the software sets not to perform data merging between antennas, the data merging is not required. Supporting multiple antennas and different PRACH formats needs to protect merged data and restore field operations.

A RACH merging unit in the PRACH of the antenna correspondingly adds front and back RACH data within the PRACH of the present antenna. If multiple antennas exist, data merging between antennas may be performed for the multiple antennas, and then RACH data merging within the PRACH of the antenna is performed, since it is required to protect the field and restore the field operation. Therefore, protecting and restoring the field are the core of the apparatus to adapt to the evolution of the 5G protocol, providing a high degree of flexibility.

Figure 8:
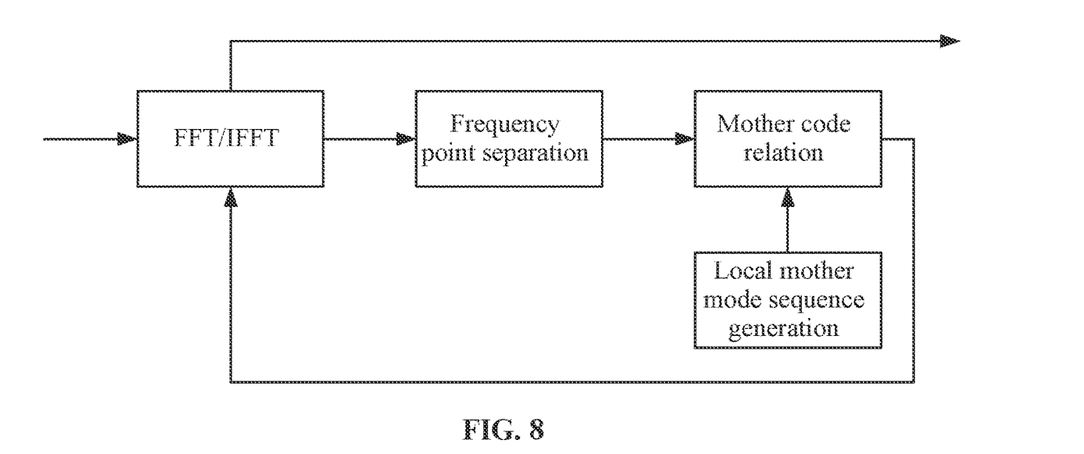
FIG. 8 is a diagram showing a processing flow of a software processing module according to an embodiment of the present disclosure.

FIG. 8 is a schematic diagram showing the function of the software processing module. The software processing module performs subsequent processing on a complete preamble sequence, such as an FFT, a frequency domain mother code relation and an IFFT. The software processing module first reads output data of the hardware acceleration module to complete the FFT operation. The frequency domain signal generated by the FFT can directly extract a sequence of multiple frequencies according to spectral distribution, and the length of the sequence is n points (different protocols have different definitions). The FFT and the IFFT use one FFT core and can complete FFT/IFFT processing of 256 points, 320 points, 384 points, 512 points, 640 points, 768 points, 1024 points, 1280 points, 1536 points, 1920 points, 2048 points, 2304 points, 3072 points, 3584 points, 4096 points, 5120 points, 6144 points, 7168 points and 8192 points.

Then, local mother code generation is completed: a discrete Fourier transform (DFT) of a Zadoff-Chu sequence corresponding to each root sequence is generated according to an index of a parameter root sequence of a cell.

Sequence of different lengths such as 839 points or 139 points obtained by mother code relation processing are padded with 0 to obtain sequences of lengths of 1536 points or 256 points, and then the sequences are subjected to the IFFT to obtain the final output result. Finally, the peak detection function is completed.

The preceding embodiments of the present disclosure have technical effects described below.

1) PRACH data merging processing is performed according to an OFDM symbol time in time division to achieve PRACH data processing of the 5G NR in real time, thus improving the processing performance, reducing the processing latency, reducing the software processing time and improving the uplink access performance.

2) The maximum degree of flexibility can be maintained by setting the parameter flexibly to support the evolution of the 5G protocol. Strong extensibility is provided to support multiple different PRACH formats, and support different merging processing for different PRACHs.

3) According to specification requirements of different products, configured parameters may be used arbitrarily, and processing apparatuses may be increased to satisfy the specification requirements, providing a high extension capacity.

From the description of the preceding embodiments, it is to be understood by those skilled in the art that the method in the preceding embodiments may be implemented by software plus a necessary general-purpose hardware platform, or may be implemented by hardware. The present disclosure may be embodied in the form of a software product. The computer software product is stored in a storage medium (such as a read-only memory (ROM)/random-access memory (RAM), a magnetic disk or an optical disc) and includes several instructions for enabling a terminal device (which may be a mobile phone, a computer, a server, a network device or the like) to execute the method in the embodiments of the present disclosure.

An embodiment further provides an apparatus for physical random access channel data merging. The apparatus is used for implementing the preceding embodiments and optional implementations, What has been described will not be repeated. The term "module" or "unit" used below may be software, hardware or a combination thereof capable of implementing preset functions.

Figure 9:
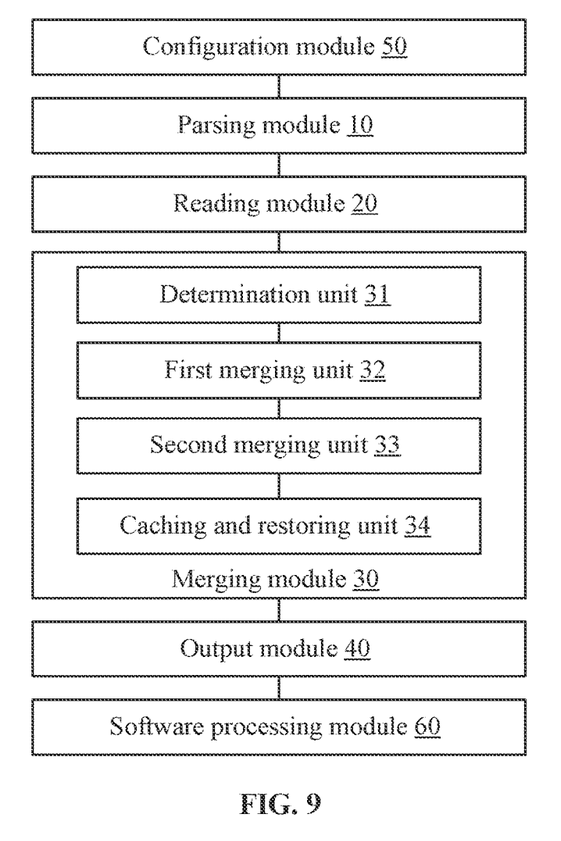
FIG. 9 is a structural diagram of an apparatus for PRACH data merging according to an embodiment of the present disclosure.

FIG. 9 is a structural diagram of an apparatus for physical random access channel data merging according to an embodiment of the present disclosure. The apparatus is different from the preceding apparatus in the division of module functions and includes a parsing module 10, a reading module 20, a merging module 30 and an output module 40, as shown in FIG. 9.

The parsing module 10 is configured to parse a task parameter of Current PRACH data merging.

The reading module 20 is configured to read to-be-merged PRAM data from an antenna PRACH data cache.

The merging module 30 is configured to perform PRACH data merging between multiple antennas and/or data merging within a PRACH of an antenna according to the task parameter The output module 40 is configured to output merged PRACH data to a shared cache.

In an optional embodiment, the merging module 30 may further include a determination unit 31, a first merging unit 32, a second merging unit 33 and a caching and restoring unit 34.

The determination unit 31 is configured to determine whether the PRACH data merging between the multiple antennas needs to be performed. The first merging unit 32 is configured to in response to the need to perform the PRACH data merging between the multiple antennas, merge PRACH data of the multiple antennas according to an OFDM symbol time in time division. The second merging unit 33 is configured to merge RACH data within a PRACH of an antenna. The caching and restoring unit 34 is configured to cache field data after PRACH data processing during a current OFDM symbol time, and restore field data of a corresponding antenna for continuing processing after PRACH data of a next OFDM symbol time arrives.

In an optional embodiment, the apparatus may further include a configuration module 50 and a software processing module 60.

The configuration module 50 is configured to configure the task parameter of the current PRACH data merging. The software processing module 60 is configured to complete processing of an FFT, a frequency domain mother code relation, an IFFT and peak detection on a merged preamble sequence.

The preceding various modules may be implemented by software or hardware. Implementation by hardware may, but may not necessarily, be performed in the following manners: the preceding various modules are located in the same processor or located in different processors in any combination form.

An embodiment of the present disclosure further provides a storage medium. The storage medium stores a computer program. The computer program is configured to, when executed, perform steps in any one of the preceding method embodiments.

Optionally, in the embodiment, the preceding storage medium may include, but is not limited to, a USB flash drive, a read-only memory (ROM), a random-access memory (RAM), a mobile hard disk, a magnetic disk, an optical disc or another medium capable of storing a computer program.

An embodiment of the present disclosure further provides an electronic apparatus. The electronic apparatus includes a memory and a processor. The memory stores a computer program. The processor is configured to execute the computer program to perform the steps in any one of the preceding method embodiments.

Those skilled in the art should understand that the preceding various modules or steps of the present disclosure may be implemented by a general-purpose computing apparatus, and the various modules or steps may be concentrated on a single computing apparatus or distributed on a network composed of multiple computing apparatuses. Optionally, the various modules or steps may be implemented by program codes executable by the computing apparatus, and the various modules or steps may be stored in a storage apparatus for execution by the computing apparatus. In some cases, the illustrated or described steps may be performed in a different order from those described herein, or the various modules or steps may be made into various integrated circuit modules separately, or multiple modules or steps therein may be made into a single integrated circuit module for implementation. The present disclosure is not limited to any specific combination of hardware and software.

What is claimed is:

1. A method for physical random access channel (PRACH) data merging, comprising:
   parsing a task parameter of current PRACH data merging;
   reading PRACH data of multiple antennas from a PRACH data cache;
   performing PRACH data merging between the multiple antennas and random access channel (RACH) data merging within a PRACH of a same antenna according to the task parameter; and
   outputting merged data to a shared cache;
   wherein the reading the PRACH data of the multiple antennas from the PRACH data cache comprises:
   reading the PRACH data of the multiple antennas from the PRACH data cache successively in units of an orthogonal frequency-division multiplexing (OFDM) symbol, and starting PRACH data merging processing every time a piece of OFDM symbol data is received.

2. The method according to claim 1, wherein the task parameter comprises at least one of: a PRACH format, a data merging mode, a data storage address or data volume of PRACH data in a current OFDM symbol.

3. The method according to claim 1, wherein the performing the PRACH data merging between the multiple antennas and the RACH data merging within the PRACH of the same antenna according to the task parameter comprises:

determining whether the PRACH data merging between the multiple antennas needs to be performed, in response to the PRACH data merging between the multiple antennas being need to perform, merging the PRACH data of the multiple antennas according to an OFDM symbol time in time division, and merging RACH data of the same antenna within a merged PRACH.

4. The method according to claim 3, wherein for the PRACH data merging between the multiple antennas or the RACH data merging within the PRACH of the same antenna, after PRACH data processing during a current OFDM symbol time, caching field data, and restoring field data of a corresponding antenna for continuing processing after PRACH data of a next OFDM symbol time arrives.

5. The method according to claim 1, before the parsing the task parameter of the current PRACH data merging, further comprising:

configuring the task parameter of the current PRACH data merging.

6. A non-transitory computer-readable storage medium storing a computer program which is configured to, when executed, implement the method of claim 1.

7. An electronic apparatus, comprising a memory and a processor, wherein the memory stores a computer program, and the processor is configured to execute the computer program to implement a method for physical random access channel (PRACH) data merging, wherein the method comprises:

parsing a task parameter of current PRACH data merging;
reading PRACH data of multiple antennas from a PRACH data cache;
performing PRACH data merging between the multiple antennas and random access channel (RACH) data merging within a PRACH of a same antenna according to the task parameter; and outputting merged data to a shared cache;
wherein the reading the PRACH data of the multiple antennas from the PRACH data cache comprises:
reading the PRACH data of the multiple antennas from the PRACH data cache successively in units of an orthogonal frequency-division multiplexing (OFDM) symbol, and starting PRACH data merging processing every time a piece of OFDM symbol data is received.

8. The electronic apparatus according to claim 7, wherein the task parameter comprises at least one of: a PRACH format, a data merging mode, a data storage address or data volume of PRACH data in a current OFDM symbol.

9. The electronic apparatus according to claim 7, wherein the performing the PRACH data merging between the multiple antennas and the RACH data merging within the PRACH of the same antenna according to the task parameter comprises:

determining whether the PRACH data merging between the multiple antennas needs to be performed, in response to the PRACH data merging between the multiple antennas being need to perform, merging the PRACH data of the multiple antennas according to an OFDM symbol time in time division, and merging RACH data of the same antenna within a merged PRACH.

10. The electronic apparatus according to claim 9, wherein for the PRACH data merging between the multiple antennas or the RACH data merging within the PRACH of the same antenna, after PRACH data processing during a current OFDM symbol time, caching field data, and restoring field data of a corresponding antenna for continuing processing after PRACH data of a next OFDM symbol time arrives.

11. The electronic apparatus according to claim 7, before the parsing the task parameter of the current PRACH data merging, further comprising:

configuring the task parameter of the current PRACH data merging.

* * * * *